(12) United States Patent
Chu et al.

(10) Patent No.: US 11,074,338 B2
(45) Date of Patent: Jul. 27, 2021

(54) LOCAL SECURE RENDERING OF WEB CONTENT

(71) Applicant: Citrix Systems, Inc., Fort Lauderdale, FL (US)

(72) Inventors: Xiaolu Chu, Nanjing (CN); Shunli Ren, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 201 days.

(21) Appl. No.: 16/343,549

(22) PCT Filed: Oct. 23, 2018

(86) PCT No.: PCT/CN2018/111418
§ 371 (c)(1),
(2) Date: Apr. 19, 2019

(87) PCT Pub. No.: WO2020/082231
PCT Pub. Date: Apr. 30, 2020

(65) Prior Publication Data
US 2021/0064739 A1   Mar. 4, 2021

(51) Int. Cl.
*G06F 21/53* (2013.01)
*G06F 40/205* (2020.01)
(Continued)

(52) U.S. Cl.
CPC .............. *G06F 21/53* (2013.01); *G06F 9/547* (2013.01); *G06F 16/986* (2019.01); *G06F 21/51* (2013.01);
(Continued)

(58) Field of Classification Search
CPC ...... G06F 21/53; G06F 16/986; G06F 40/205; G06F 9/547; G06F 21/51
(Continued)

(56) References Cited

U.S. PATENT DOCUMENTS

| 7,523,316 B2 * | 4/2009 | Cheng ..................... G06F 21/32 |
| | | 713/182 |
| 7,664,865 B2 | 2/2010 | Parikh et al. |

(Continued)

FOREIGN PATENT DOCUMENTS

| CN | 104063460 | 9/2014 |
| CN | 108052539 | 5/2018 |
| WO | WO-2011086610 A1 * | 7/2011 ........... G06F 40/205 |

OTHER PUBLICATIONS

I. Grigorik; "Constructing the Object Model"; Retrieved from the Internet: URL: https://developers.google.com/web/fundamentals/performance/critical-rendering-path/constructing-the-object-model; Aug. 22, 2018; 7 pages.

(Continued)

*Primary Examiner* — Farid Homayounmehr
*Assistant Examiner* — Thanh T Le
(74) *Attorney, Agent, or Firm* — BainwoodHuang (57) ABSTRACT

A technique for securely rendering content downloaded over a network includes parsing a downloaded web page into a DOM (Document Object Model) tree and splitting the DOM tree into multiple DOM instances, where each DOM instance is dedicated to a respective type of web content. The technique processes each DOM instance using a respective render engine, which implements the security policy on the respective type of web content by blocking or altering content, and/or by limiting functionality that may be used in connection with the content.

18 Claims, 6 Drawing Sheets

(51) Int. Cl.
*G06F 21/51* (2013.01)
*G06F 16/958* (2019.01)
*G06F 9/54* (2006.01)

(52) U.S. Cl.
CPC .... *G06F 40/205* (2020.01); *G06F 2221/2119* (2013.01)

(58) Field of Classification Search
USPC .......................................................... 726/1
See application file for complete search history.

(56) References Cited

U.S. PATENT DOCUMENTS

| | | | | |
|---|---|---|---|---|
| 8,225,197 | B1* | 7/2012 | Szewczyk | G06F 16/951 715/241 |
| 8,402,011 | B1 | 3/2013 | Bodenhamer | |
| 8,601,565 | B1* | 12/2013 | Sakata | G06F 21/606 726/11 |
| 8,613,070 | B1* | 12/2013 | Borzycki | H04L 67/10 726/8 |
| 8,850,516 | B1* | 9/2014 | Hrebicek | G06F 16/1734 726/1 |
| 8,898,732 | B2 | 11/2014 | Qureshi | |
| 8,950,005 | B1* | 2/2015 | Torney | H04L 63/20 726/29 |
| 9,922,191 | B1* | 3/2018 | Graft | G06F 21/564 |
| 10,198,575 | B2* | 2/2019 | Palanichamy | G06F 21/53 |
| 10,452,758 | B1* | 10/2019 | Bhowmick | H04L 67/02 |
| 2005/0144454 | A1* | 6/2005 | Hare | G06T 1/0085 713/176 |
| 2007/0174915 | A1* | 7/2007 | Gribble | G06F 21/566 726/24 |
| 2010/0192224 | A1* | 7/2010 | Ferri | G06F 21/53 726/23 |
| 2011/0065419 | A1* | 3/2011 | Book | G06F 21/6218 455/411 |
| 2012/0110437 | A1 | 5/2012 | Pan et al. | |
| 2012/0260111 | A1* | 10/2012 | Tarkoma | G06F 1/3203 713/300 |
| 2013/0159839 | A1 | 6/2013 | Joffray et al. | |
| 2014/0283127 | A1* | 9/2014 | Chacko | G06F 21/6263 726/28 |
| 2014/0338000 | A1* | 11/2014 | Newman | G06F 21/62 726/27 |
| 2015/0106157 | A1* | 4/2015 | Chang | G06Q 30/0201 705/7.29 |
| 2015/0106950 | A1* | 4/2015 | Holman | G06F 21/6245 726/26 |
| 2015/0256545 | A1* | 9/2015 | Dotterer, III | H04W 76/12 726/1 |
| 2015/0347365 | A1* | 12/2015 | Li | G06F 40/166 713/193 |
| 2016/0171188 | A1* | 6/2016 | Chow | H04N 21/4383 726/28 |
| 2018/0052992 | A1* | 2/2018 | Palanichamy | G06F 21/53 |
| 2018/0330096 | A1* | 11/2018 | Breindel | A63F 13/358 |
| 2019/0199740 | A1* | 6/2019 | Zhang | H04L 63/145 |
| 2019/0311132 | A1* | 10/2019 | Arnoth | G06F 21/53 |

OTHER PUBLICATIONS

I. Grigorik; "Render-tree Construction, Layout, and Paint"; Retrieved from the Internet: URL: https://developers.google.com/web/fundamentals/performance/critical-rendering-path/render-tree-construction ; Aug. 22, 2018; 7 pages.

PCT/CN2018/111418 Notification of the International Search Report and the Written Opinion of the International Searching Authority, or the Declaration dated Jul. 24, 2019, 8 pages.

* cited by examiner

FIG. 3A
(DOM Tree)

FIG. 3B
(DOM Instance 0)

FIG. 3C
(DOM Instance 1)

FIG. 3D
(DOM Instance 2)

FIG. 3E
(DOM Instance 3)

FIG. 4
(Render Tree)

LOCAL SECURE RENDERING OF WEB CONTENT

BACKGROUND

Modern computing devices commonly employ web browsers to enable users to visit websites and download content over a computer network, such as the Internet. The heart of a web browser is its browser engine, a software component that processes downloaded content, e.g., for rendering web pages and supporting user interaction. Many applications (or "apps") besides web browsers employ integrated browser engines, which may access resources on the web with or without direct user involvement.

Some browser engines enforce security policies by filtering or altering content received over a computer network. For example, a user or administrator may configure a browser engine to block certain URLs (Uniform Resource Locators), to block certain functionality, such as view-source, or to render watermarks on images, for example.

Some browser engines work in cooperation with virtualized cloud-based browsers. For example, if a local browser engine encounters a suspect web address (e.g., one suspected of containing malicious content), the local browser engine may dispatch the web address to the secure browser in the cloud and display the secure browser on a local screen as a virtualized application. The secure browser renders the suspect content and allows a local user to view the content, but such content executes in the cloud, rather than on the local machine, thus isolating the local machine from effects of any malicious content.

SUMMARY

Unfortunately, the above-described prior approaches have limitations. For example, prior browser engines typically employ only a single security policy that applies to an entire web page as a whole, where the policy is based on URL or domain of the page being accessed. Such policies may be appropriate for simple pages, but web pages increasingly draw together content from multiple sources. It is not uncommon, for example, for a web page to include embedded images, videos, or other content hosted from other sites. In such cases, the prior approach may render all the content on the page, including content from other sites, using the same security settings. This behavior is not always appropriate, however, as the best policy settings for an initial landing page may be quite different from that for embedded content from other sites. Thus, the prior approach may render embedded content inappropriately, either more or less restrictively than it would be if the embedded content were accessed as a landing page. More generally, the prior approach is more uniform and coarsely applied than would be ideal. In addition, prior approaches that employ virtualized, cloud-based browsers can be complex to operate and administer. For example, such approaches may require session cookies and source address information to be shared across a network between a local browser engine and a cloud-based browser. Thus, what is needed is a way of enforcing security on web pages that operates at finer granularity than that of a URL or domain and that avoids having to coordinate browser sessions across a network.

In contrast with prior approaches, an improved technique for securely rendering content downloaded over a network includes parsing a downloaded web page into a DOM (Document Object Model) tree and splitting the DOM tree into multiple DOM instances, where each DOM instance is dedicated to a respective type of web content. The technique processes each DOM instance using a respective render engine, which implements the security policy on the respective type of web content by blocking or altering content, and/or by limiting functionality that may be used in connection with the content.

Advantageously, the improved technique allows policies to be applied at the fine granularity of web-content types and is thus not limited to the coarse granularity of URLs or domains. In addition, the improved technique simplifies operation and administration by running multiple render engines locally, rather than by sharing session information and source addresses with virtualized browsers across a network.

In some examples, the client device runs a user process and one or more of the render engines runs in a sandbox. The sandbox does not communicate with the user process except via IPC (Inter-Process Communication), thereby preventing malicious content processed by the render engine from spreading to the user process.

In some examples, running the render engines includes running multiple render engines in respective sandboxes. The client device enables a first render engine running in a first sandbox to access data of a second render engine running in a second sandbox, but only responsive to the first render engine and the second render engine referencing content solely from the same web domain. The client device also prevents the first render engine from accessing data of a third render engine in a third sandbox, responsive to the first render engine and the third render engine referencing content from different web domains. In some embodiments, restricting communication between render engines that access different domains prevents malicious content in one domain from accessing content hosted by another domain.

In some examples, context information regarding an operating state of the client device is provided to a policy engine that acts as a server of the policy. In such cases, splitting the DOM tree into multiple DOM instances is further based on the context information.

In some examples, the technique further includes parsing the web page into a CSSOM (Cascading Style Sheet Object Model) tree. The CSSOM tree contains style information pertaining to web elements represented in the DOM tree. Prior to splitting the DOM tree, the technique further includes updating the DOM tree to include a set of style information represented in the CSSOM tree.

In some examples, splitting the DOM tree into multiple DOM instances includes traversing a set of nodes of the DOM tree and, for each current node of the DOM tree, (i) querying the policy engine, the querying specifying the current node of the DOM tree, (ii) receiving, from the policy engine in response to the querying, an action indicator that indicates a security action to be performed on the current node in accordance with the policy, (iii) assigning, based at least in part on the action indicator, the current node to a current category of web content, and (iv) placing the current node and its attributes in a current DOM instance dedicated to the current category of web content.

In some examples, in response to no current DOM instance having been created on the client device for the current category of web content, the technique further includes creating the current DOM instance dedicated to the current category of web content.

In some examples, the policy engine runs on a server connected to the client device over a computer network.

In some examples, running a render engine for the current DOM instance includes implementing a security action indicated by the action indicator.

In some examples, the categories of web content include a first category designated for image content, and splitting the DOM tree includes creating a first DOM instance dedicated to image content. Upon traversing the DOM tree, the technique further includes encountering an image node in the DOM tree that specifies an image, and querying the policy engine by specifying the image node, the querying returning a first action indicator that indicates a watermark to be applied to the image. In such cases, running the render engines includes running a first render engine for the first DOM instance. The first render engine applies the watermark to the image.

In some examples, the categories of web content include a second category for video content, and splitting the DOM tree includes creating a second DOM instance dedicated to video content. Upon traversing the DOM tree, the technique further includes encountering a video node in the DOM tree that specifies a video, and querying the policy engine by specifying the video node, the querying returning a second action indicator that indicates that the video is to be blocked. In such cases, running the render engines includes running a second render engine for the second DOM instance. The second render engine blocks the video.

In some examples, the categories of web content include a third category for text content, and splitting the DOM tree includes creating a third DOM instance dedicated to text content. Upon traversing the DOM tree, the technique further includes encountering a text node in the DOM tree that includes a portion of text, and querying the policy engine by specifying the text node, the querying returning a third action indicator that indicates that the portion of text is to be replaced with alternative text and/or formatting. In such cases, running the render engines includes running a third render engine for the third DOM instance, the third render engine providing the alternative text and/or formatting in place of the portion of text.

In some examples, the technique further includes querying the policy engine by specifying a characteristic of the web page. In response to the querying, the technique includes receiving back a fourth action indicator pertaining to a user action that the client device supports on the web page. In response to the fourth action indicator indicating that the user action is prohibited, the technique further includes directing a user-interface engine to block the user action from being performed.

According to some variants, the user action is a view-source action for enabling a user to view source code of the web page.

According to some variants, the user action is a save-as action for enabling a user to save a copy of a web page or to save an element displayed in the web page.

In some examples, the client device generates the render tree with first security modifications in response to a first loading of the web page by the client device when the client device operates in a first context. Further, the client device generates the render tree with second security modifications, different from the first security modifications, in response to a second loading of the web page by the client device when the client device operates in a second context.

In some examples, splitting the DOM tree includes providing, in at least one of the DOM instances, metadata that describes a structure of the DOM tree. In such cases, merging the render instances into the single render tree includes (i) accessing the metadata and (ii) placing web elements into the render tree at locations described by the metadata.

Certain embodiments are directed to a method of securely rendering content downloaded over a network. The method includes parsing, by a client device, a web page downloaded over the network into a DOM (Document Object Model) tree, and splitting, based on a policy, the DOM tree into multiple DOM instances, each DOM instance dedicated to a respective type of web content. The method further includes running multiple render engines, each render engine running for a respective one of the DOM instances and performing rendering activities on the respective DOM instance for the respective type of web content. At least one of the render engines modifies web content of the respective type in accordance with the policy. The method still further includes merging output from the render engines into a single render tree, the render tree providing a basis for painting a viewable version of the web page on the client device with content that has been modified in accordance with the policy.

Other embodiments are directed to a client device constructed and arranged to perform a method of securely rendering content downloaded over a network, such as the method described above. Still other embodiments are directed to a computer program product. The computer program product stores instructions which, when executed on control circuitry of a client device, cause the client device to perform a method of securely rendering content downloaded over a network, such as the method described above.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for securely rendering content downloaded over a computer network includes parsing a downloaded web page into a DOM (Document Object Model) tree and splitting the DOM tree into multiple DOM instances, where each DOM instance is dedicated to a respective type of web content. The technique processes each DOM instance using a respective render engine, which implements the security policy on the respective type of web content by blocking or altering content, and/or by limiting functionality that may be used in connection with the content.

Figure 1:
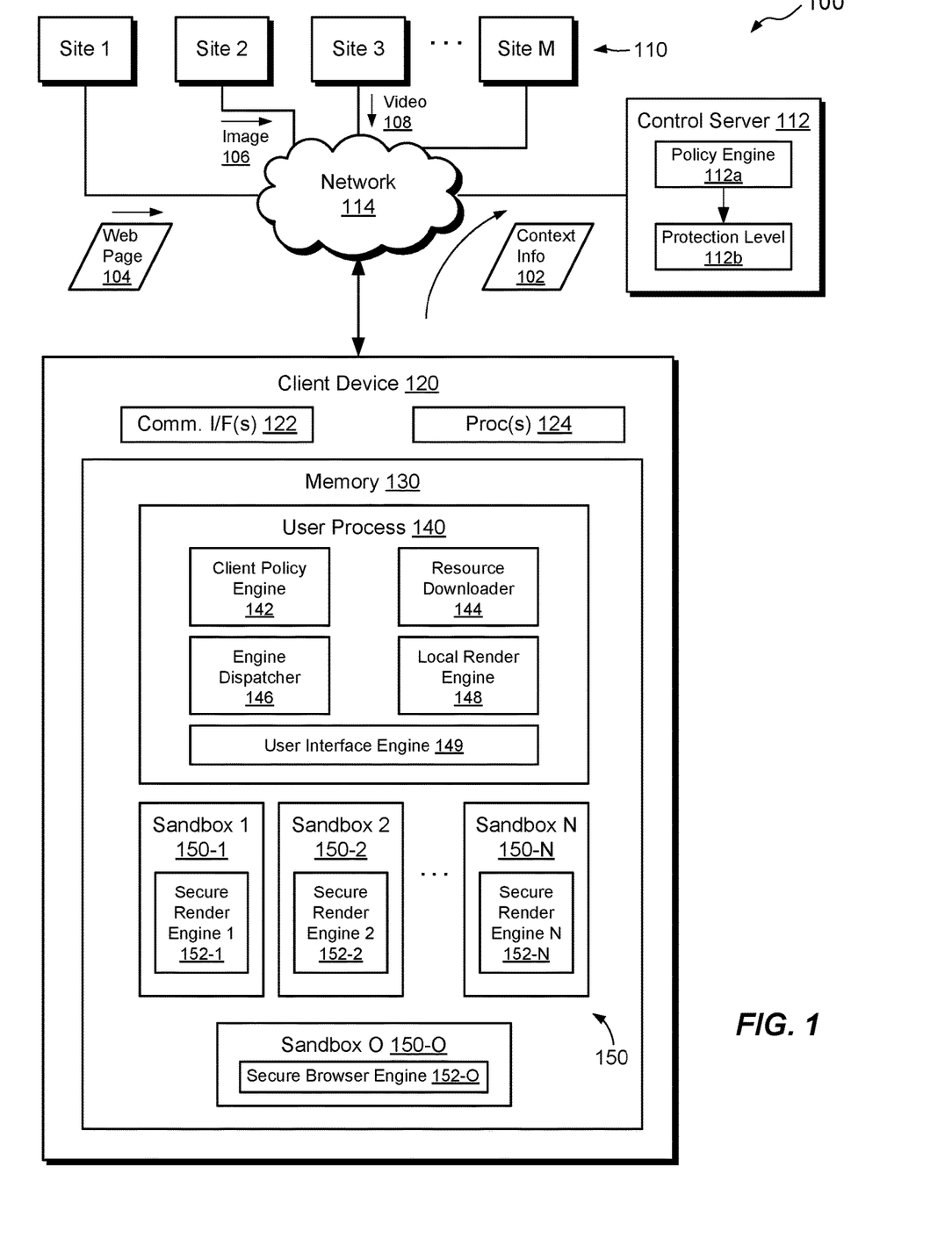
FIG. 1 is a block diagram of an example environment in which embodiments of the improved technique hereof can be practiced.

FIG. 1 shows an example environment 100 in which embodiments of the improved technique hereof can be practiced. Here, a client device 120 operatively connects to various sites 110 over a network 114, such as the Internet, a WAN (Wide Area Network), a cellular data network, or any combination of networks, for example. The sites (i.e., sites 1-M) store network-accessible resources, such as web pages, web applications, pictures, videos, documents, and so forth, which are accessible by the client device 120 using network protocols, such as HTTP (HyperText Transfer Protocol), HTTPS (HTTP Secure), FTP (File Transfer Protocol), and the like. In some examples, a control server 112 connects to the network 114 and runs a policy engine 112a, which is configured to enforce a security policy by analyzing contextual information accompanying requests from the client device 120 and identifying protection levels 112b, which the client device 120 may apply.

The client device 120 may be any computing device having one or more communication interfaces 122 (e.g., Ethernet, cellular data, etc.), one or more processors 124 (e.g., processing chips, assemblies, etc.), and memory 130, which may include both volatile memory, such as RAM (Random Access Memory) and non-volatile memory, such as one or more disk drives, flash memory, solid-state memory, or the like. Examples of suitable computing devices include desktop computers, laptop computers, tablet computers, smart phones, PDAs (Personal Data Assistants), set-top boxes, gaming consoles, IOT (Internet-Of-Things) devices, and so forth. The processor(s) 124 and the memory 130 together form control circuitry, which is constructed and arranged to carry out various methods and functions as described herein. Also, the memory 130 includes a variety of software constructs realized in the form of executable instructions. When the executable instructions are run by the processor(s) 124, the processor(s) 124 carry out the operations of the software constructs. Although certain software constructs are specifically shown and described, it is understood that the memory 130 typically includes many other software constructs (not shown), such as an operating system, various applications, processes, and daemons.

As further shown in FIG. 1, the memory 130 "includes," i.e., realizes by execution of software instructions, a user process 140 and various sandboxes 150-1 through 150-O (collectively, 150). In an example, the user process 140 is a main userspace instance, such as a user's account space, and the sandboxes 150 are separate operating system processes, e.g., "containers," which are implemented in separate memory space from the user process 140 and from one another, but which share the same operating-system kernel with the user process.

Preferably, the client device 120 does not support communication between the user process 140 and the sandboxes 150, except via IPC (Inter Process Communication). For example, the user process 140 and any of the sandboxes 150 may use IPC to exchange data structures and/or software instructions, such as JavaScript. In some examples, sandboxes 150 also exchange data structures and/or JavaScript with one another, via IPC, although communication between certain sandboxes 150 may be prohibited.

As further shown, the user process 140 is configured to operate various software constructs, such as a client policy engine 142, a resource downloader 144, an engine dispatcher 146, a local render engine 148, and a user interface engine 149. The client policy engine 142 is configured to serve policy information to other software constructs running on the client device 120. For example, the client policy engine 142 acts as an interface between the client device 120 and the policy engine 112a on the control server 112. In some examples, the policy engine 142 caches certain policy information locally, such that it is not necessary to always contact the control server 112 whenever such policy information is needed. The resource downloader 144 is configured to download web pages and other web content over the network 114. Downloading may be based on policy. For example, the resource downloader 144 may contact the client policy engine 142 to determine whether a resource is safe before downloading it. The engine dispatcher 146 is configured to analyze web content and selectively to dispatch such content to various render engines, and the local render engine 148 is configured to perform rendering activities on certain web content (that which the engine dispatcher 146 does not dispatch to other render engines). The user interface engine 149 is configured to receive and process user input, such as user commands and entered data.

As still further shown, sandboxes 150-1 through 150-N include respective secure render engines 152-1 through 152-N. Likewise, sandbox 150-O includes a secure browser engine 152-O. The secure render engines 152-1 through 152-N are configured to render web content of respective web-content types, and the secure browser engine 152-O is configured to perform layout and painting operations, as well as to receive user input from the user interface engine 149 and to selectively block or modify user requests.

In example operation, a user of the client device 120 requests access to a web resource, such as a website, e.g., by entering the text of a URL or by clicking a link displayed in a browser. In response, the resource downloader 144 contacts the client policy engine 142 to check that the resource is safe, e.g., not blacklisted. In some examples, the resource downloader 144 sends context information 102 to the policy engine (144 and/or 112a), and the policy engine applies the context information 102 in determining whether to allow or block access to the requested content. For example, the client device 120 may be allowed access to certain web content if the client device 120 is operating within an organization's network, but may be blocked from accessing such content if the client device 120 is operating outside that network. Context information 102 may include, for example, user identifier, network address, device type, geo-location, and so forth—any information that may be relevant to assessing access rights or authentication.

Figure 2:
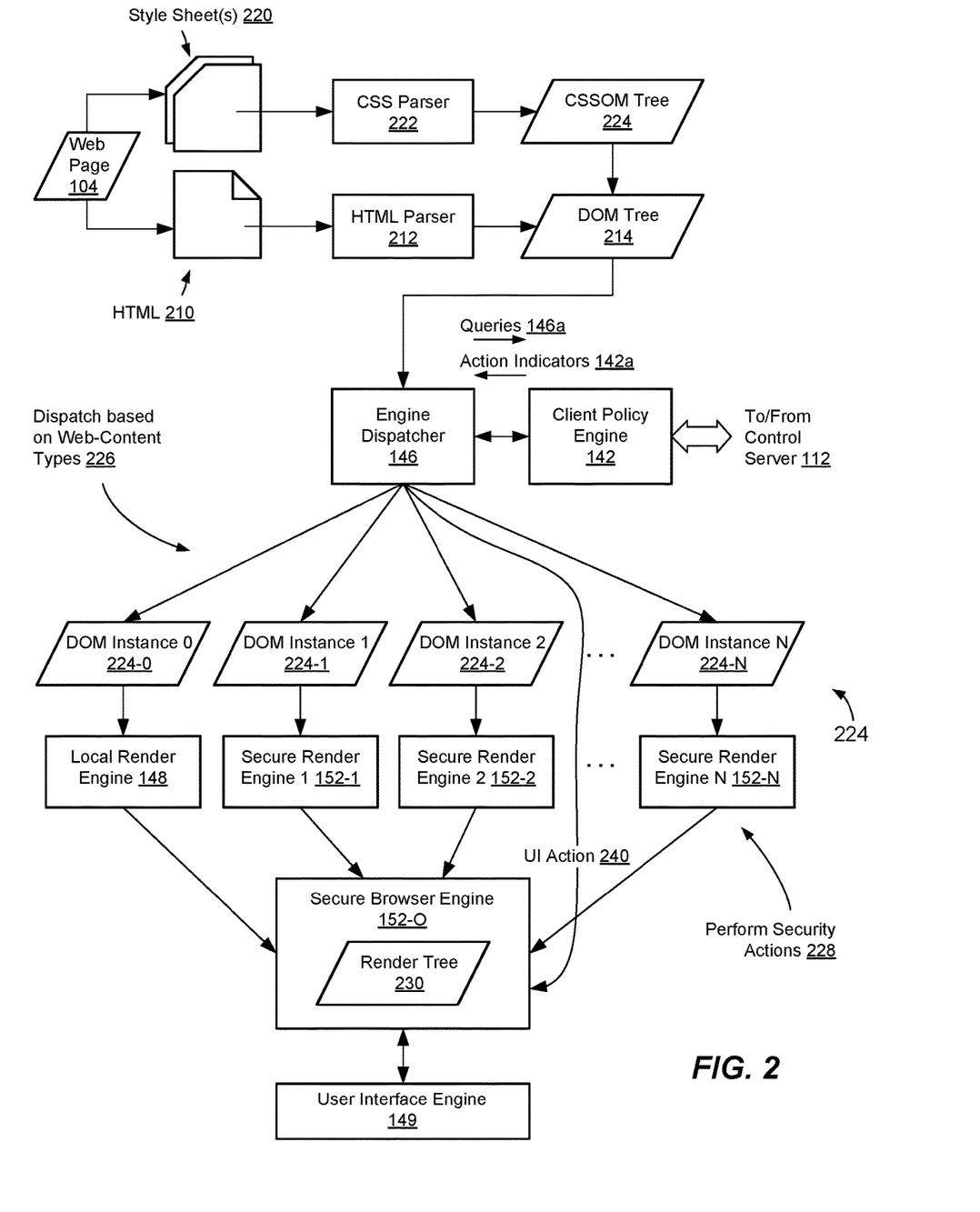
FIG. 2 is a flow diagram that shows example secure processing of a web page in the environment of FIG. 1.

FIG. 2 shows further aspects of operation. Here, assuming the web page 104 has been downloaded, the user process 140 receives the web page 104 and proceeds to identify its contents, including HTML (HyperText Markup Language) 210 and any style sheets 220. An HTML parser 212 parses the HTML into a DOM (Document Object Model) tree 214, and a CSS (Cascading Style Sheet) parser 224 parses the style sheet(s) 220 into a CSSOM (CSS Object Model) tree 224. As is known, a DOM tree is a tree of nodes wherein each node identifies a web element or feature in the HTML of a web page, such as <P>, <IMG>, or text, and any associated attributes (e.g., sources, identifiers, names, formatting, etc.). Each node of a DOM tree (except the top node) has exactly one parent, and each parent can have any number of children. The DOM tree thus provides a hierarchical model of a web page. The DOM tree is also controllable via software, such as JavaScript, which can access the DOM tree as a software object and manipulate its contents. The CSSOM tree is a similarly structured tree, which represents a hierarchy of styles (e.g., fonts, colors, spacing, etc.) to be applied to web elements. Using known methods, the user process 140 merges the CSSOM tree into the DOM tree, such that the DOM tree reflects not only the HTML elements of the web page 104, but also the styles with which those elements are to be rendered.

With the DOM tree 214 created and the styles merged into the DOM tree 214, the engine dispatcher 146 accesses the DOM tree 214 and traverses its nodes. For example, for each node in the DOM tree 214, the engine dispatcher 142 sends the node (or a descriptor thereof) to the client policy engine 142 in a query 146a. In response to the query 146a, the client policy engine 142 checks the node against the policy and returns an action indicator 142a, which specifies an action to be performed on the node in accordance with the policy. In some examples, the action indicator 142a is further based on context information 102. The engine dispatcher 146 evaluates the action indicator 142a and assigns the node to a particular render engine, e.g., either to the local render engine 148 or to one of the secure render engines 152-1 through 152-N running in the respective sandboxes.

Selection of a render engine to which to dispatch a DOM node is based on web-content type 226, i.e., the type of web content to which the DOM node belongs. The engine dispatcher 146 may assign web-content types 226 using any desired criterion. For example, web-content type 226 may be based on the domain from which the content is served, with content served from one domain belonging to one web-content type 226 and content served from another domain belonging to another web-content type 226. Web-content type 226 may alternatively be based upon HTML element, with hyperlinks like <A HREF . . . > forming one web-content type 226 and images like <IMG . . . > forming another. Web-content types 226 may reflect multiple criteria. For example, <A HREF . . . > elements from one domain may form a first content type, while <A HREF . . . > elements from another domain may form a second content type. <IMG . . . > elements from the two domains may form two additional web-content types 226.

The web-content types 226 as used by the engine dispatcher 146 may be fixed or variable. For example, the engine dispatcher 146 may assign DOM nodes for processing one web page using a first set of web-content types, but may assign nodes for processing another web page using a second set of web-content types. Thus, all web pages need not be processed using the same set of web-content types. Applied web-content types may also be varied over time and based on policy.

In some examples, the engine dispatcher 146 recognizes a "normal" web-content type, i.e., one for which member elements need not be processed with enhanced security. Example elements of the normal type may include <HTML>, <BODY>, <HEAD>, and <P> elements that are served from the same domain as the web page 104. In some examples, the engine dispatcher 146 sends DOM nodes for such normal elements to the local render engine 148, which runs within the user process 140. However, elements belonging to web-content types that are not "normal" are sent to the secure render engines 152-1 through 152-N, which are more secure and are each dedicated to their own respective web-content types. In some cases, querying the policy engine may be limited to a subset of nodes of the DOM tree 214, e.g., for nodes that do not accept attributes and can thus be typed as normal without having to contact the policy engine.

When dispatching DOM nodes to render engines, the engine dispatcher 146 generates a respective DOM instance (one of 224-O through 224-N) and passes that DOM instance as a data structure to the respective render engine. Each DOM instance 224 is a version of the DOM tree 214 that includes only those DOM nodes that belong to the respective web-content type. For example, DOM instance 224-0 contains only those DOM nodes that the engine dispatcher 146 has identified as "normal." When passing the DOM instances 224 to render engines, the engine dispatcher 146 passes each dispatched DOM node along with its attributes. Thus, for example, when passing a node corresponding to an <IMG . . . > element, the engine dispatcher 146 also passes the attributes of the <IMG . . . > element, such as a SRC attribute. In some examples, the engine dispatcher 146 further passes metadata to the render engine, which enables the render engine to locate each DOM node in the overall DOM tree 214. In one illustrative example, such metadata includes pseudo-nodes, i.e., nodes without attributes that act as placeholders for maintaining the location of each node in the overall structure of the DOM tree 214. The DOM instance 224 for a particular render engine may thus provide a pseudo-node for each node of the DOM tree 214 that is not dispatched to that render engine. The metadata is need not be provided as pseudo-nodes, however. For example, other metadata may be used to keep track of where nodes belong in the DOM tree 214, such as unique identifiers applied to each node.

In some examples, the engine dispatcher 146 instantiates or otherwise creates secure render engines in real time, on the fly. For example, upon the engine dispatcher 146 assigning a DOM node to a particular web-content type 226, the engine dispatcher 146 may determine that no secure render engine is currently running for that particular web-content type. The engine dispatcher 146 may then take steps to instantiate a new sandbox and a new render engine in that sandbox, where the new render engine is dedicated to the particular web-content type.

Each render engine performs security actions 228 on its respective DOM instance 224 in accordance with the action indicators 142a for the dispatched nodes of that DOM instance. For example, an action indicator 142 may specify that a watermark be added to an image, that a video be blocked, that certain user functionality be blocked, or that text appearing on a page be removed or replaced with different text and/or formatting. Each render engine performs the indicated actions on the dispatched nodes that it has received. For example, a render engine may apply a watermark to an image by obtaining the image from the resource downloader 144 and performing alpha blending of the image with the watermark, such that the watermark becomes superimposed on the image. A render engine may block a video by rendering an empty container where the video would normally be placed. A render engine may remove or modify text by searching for a specified portion of text and deleting it or replacing it. Each render engine typically performs no action on the pseudo-nodes that it receives.

Once the render engines 148 and 152-1 through 152-N have completed their processing of the respective DOM instances 224-O through 224-N, the render engines pass their modified DOM instances, along with the associated metadata (e.g., pseudo-nodes) to the secure browser engine 152-O, which merges the modified DOM instances to produce a render tree 230. In an example, the render tree 230 has a structure that is similar to those produced by conventional web browsers, except that some of the nodes of the render tree 230 have been modified by one or more of the render engines based on the policy. If running as part of a web browser, the secure browser engine 152-O may next perform layout and painting operations, enabling the client device 120 to display the modified web page on a screen.

In some examples, the secure browser engine 152-O receives input from the engine dispatcher 146 in the form of a user-interface action 240, which specifies a modification to normal user-interface processing. For example, a user-interface action 240 may direct the secure browser engine 152-O to block or modify certain user commands, such as save-as or view-source. When the user-interface engine 149 detects an event indicating that a user of the client device 120 has issued a save-as or view-source command, the user-interface engine 149 marshals the event and sends it to the secure browser engine 152-O, which blocks or modifies the event according to the particulars of the user-interface action 240.

One should appreciate that the content of the render tree 230 is based on multiple factors, which may include not only the policy as provided by the policy engine but also the context information 102. Thus, for example, without any changes to the policy, the client device 120 may produce the render tree with one set of security modifications upon a first loading of the web page 104, but may produce a different render tree with a different set of security modifications upon a second loading of the same web page 104, based solely on a difference in context information 102. For example, the client device 120 may have access to a particular document when it operates on-premises, but may have no access to the same document when it operates off-premises.

Figure 3A:
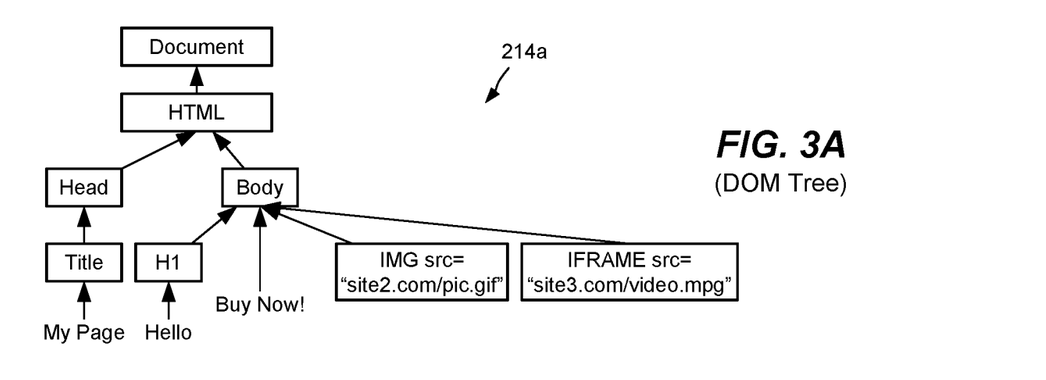
FIGS. 3A-3E are diagrams that show an example sequence of processing a DOM tree using multiple DOM instances.

FIGS. 3A-3E show an example sequence of processing for a DOM tree 214 by the engine dispatcher 146. FIG. 3A shows an example DOM tree 214a for a simplified web page. The DOM tree 214a includes various nodes, i.e., Document, HTML, Head, Body, Title, H1, IMG, IFRAME, and text nodes "My Page," "Hello," and "Buy Now!." Style content has been omitted for simplicity, but the reader should appreciate that a CSSOM tree may be merged into the DOM tree 214a.

Next, we assume that the engine dispatcher 146 has sent a query 146a to the client policy engine 142 for each node of the DOM tree 214a (or for some subset of nodes), has received back an action indicator 144a for each such node, and has applied a policy for assigning a web-content type 226 to each such node. In the example shown, four web-content types 226 are assumed: a normal type for DOM Instance 0 (FIG. 3B), an image type for DOM Instance 1 (FIG. 3C), a video type for DOM Instance 2 (FIG. 3D), and a text substitution type for DOM Instance 3 (FIG. 3E). Consistent with FIG. 2, local render engine 148 processes DOM Instance 0, and secure render engines 152-1, 152-2, and 152-3 process DOM Instances 1, 2, and 3, respectively.

Figure 3B:
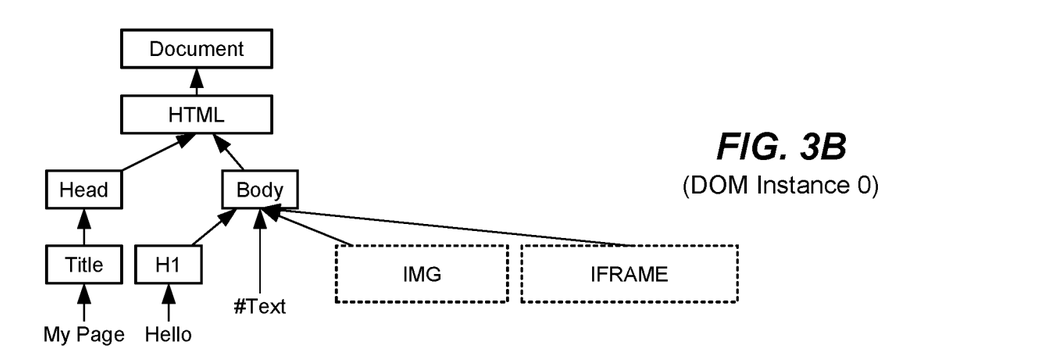
Figure 3C:
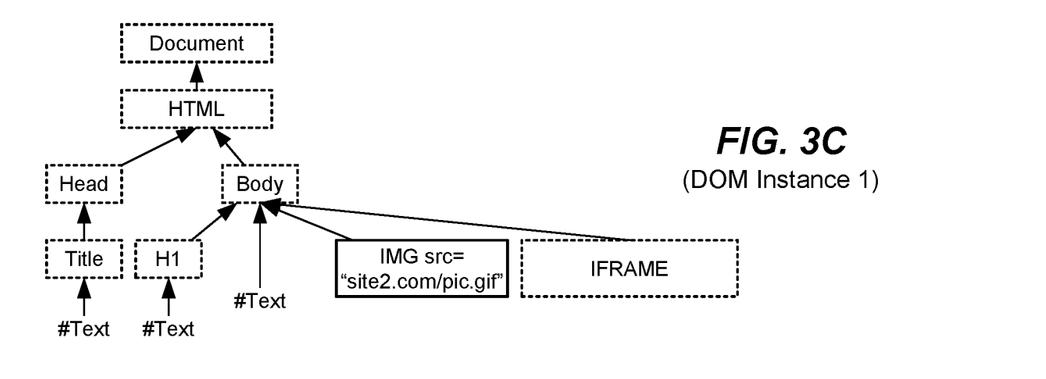
Figure 3D:
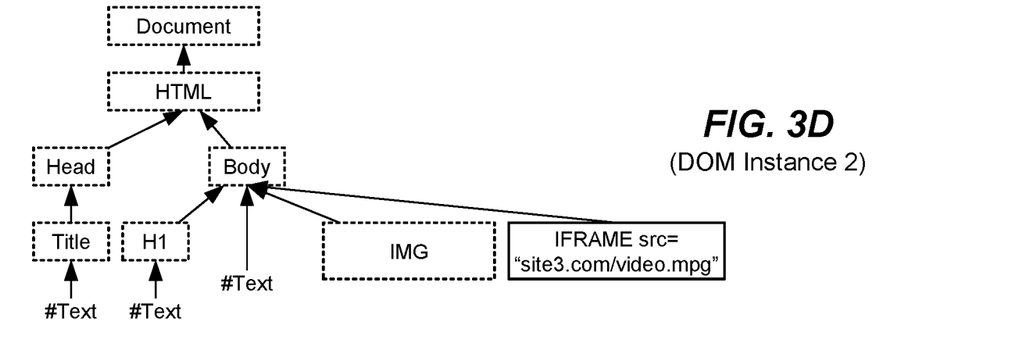
Figure 3E:
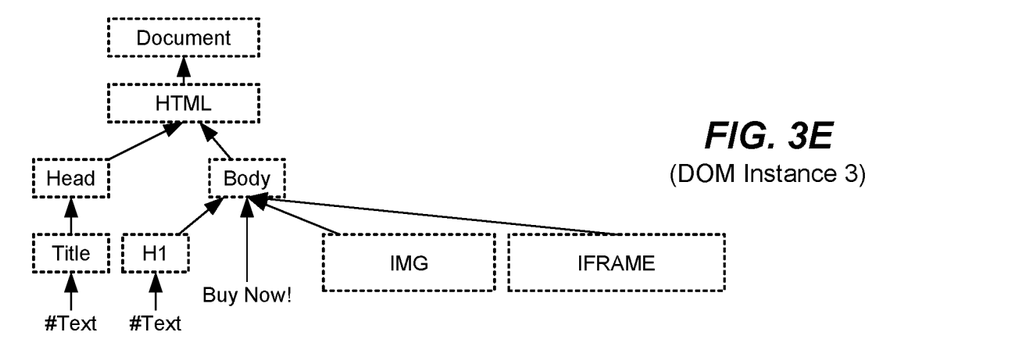

FIGS. 3B-3E show the DOM instances as processed by the respective render engines. In FIG. 3B, DOM Instance 0 includes only normal nodes, i.e., nodes for which no enhanced security is required. More suspect nodes of the DOM tree 214a, i.e., IMG, IFRAME, and the text "Buy Now!" have been rendered as pseudo-nodes, i.e., placeholders with no corresponding attributes. In FIG. 3C, DOM Instance 1 includes only the IMG node, including all of its attributes, but represents all other nodes of the DOM tree 214a as pseudo-nodes. In a like manner, FIG. 3D shows DOM Instance 2 including only the IFRAME node that references a video, with pseudo-nodes provided in all other locations. Finally, FIG. 3E shows DOM Instance 3, which includes only the text to be modified, with all other nodes being pseudo-nodes.

Figure 4:
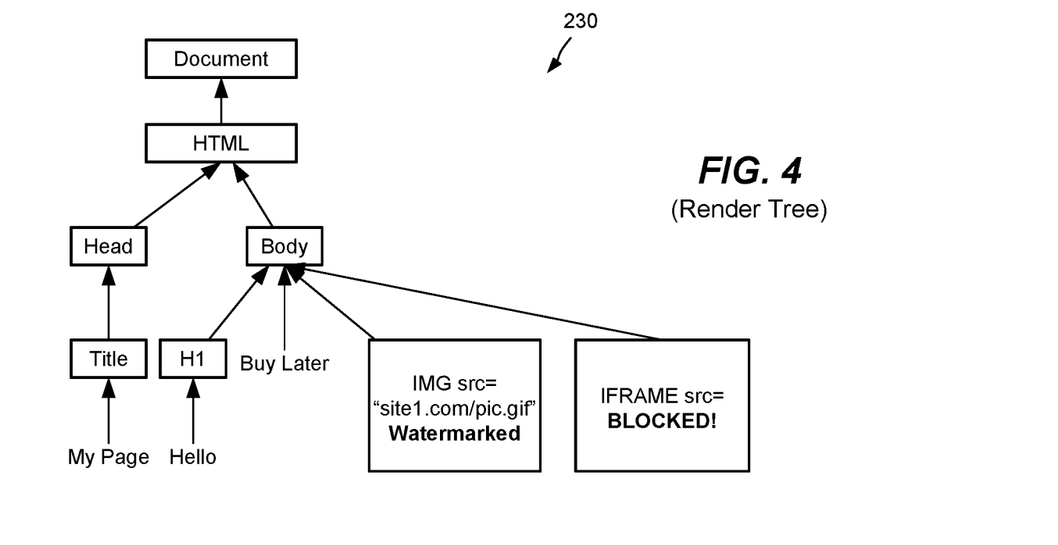
FIG. 4 is a diagram of an example render tree, which has been created by merging the DOM instances after they have been processed by respective render engines.

FIG. 4 shows an example render tree 230, which the secure browser engine 152-O has generated by merging Render Instances 0-3 after the respective render engines have performed their specified actions. For example, the local render engine 148 has simply passed through the nodes of DOM Instance 0, which appear just as they did in the initial DOM tree 114a. But secure render engines 152-1, 152-2, and 152-3 have modified their respective nodes in accordance with the policy. Thus, the IMG node dispatched to secure render engine 152-1 is now watermarked, the video dispatched to secure render engine 152-2 is now blocked, and the text portion "Buy Now!" dispatched to secure render engine 152-3 is now replaced with "Buy Later."

In an example, the secure browser engine 152-O generates the render tree 230 from DOM Instances 0-3 by traversing DOM Instance 0 (FIG. 3B), populating the render tree 230 with all of the dispatched nodes to DOM instance 0, and then adding content for the pseudo-nodes of DOM Instance 0 by accessing DOM Instances 1-3 and plugging in their dispatched, processed nodes to the render tree 230. The secure browser engine 152-O may then perform layout and paint operations to display the modified web page on the client device 120.

Figure 5:
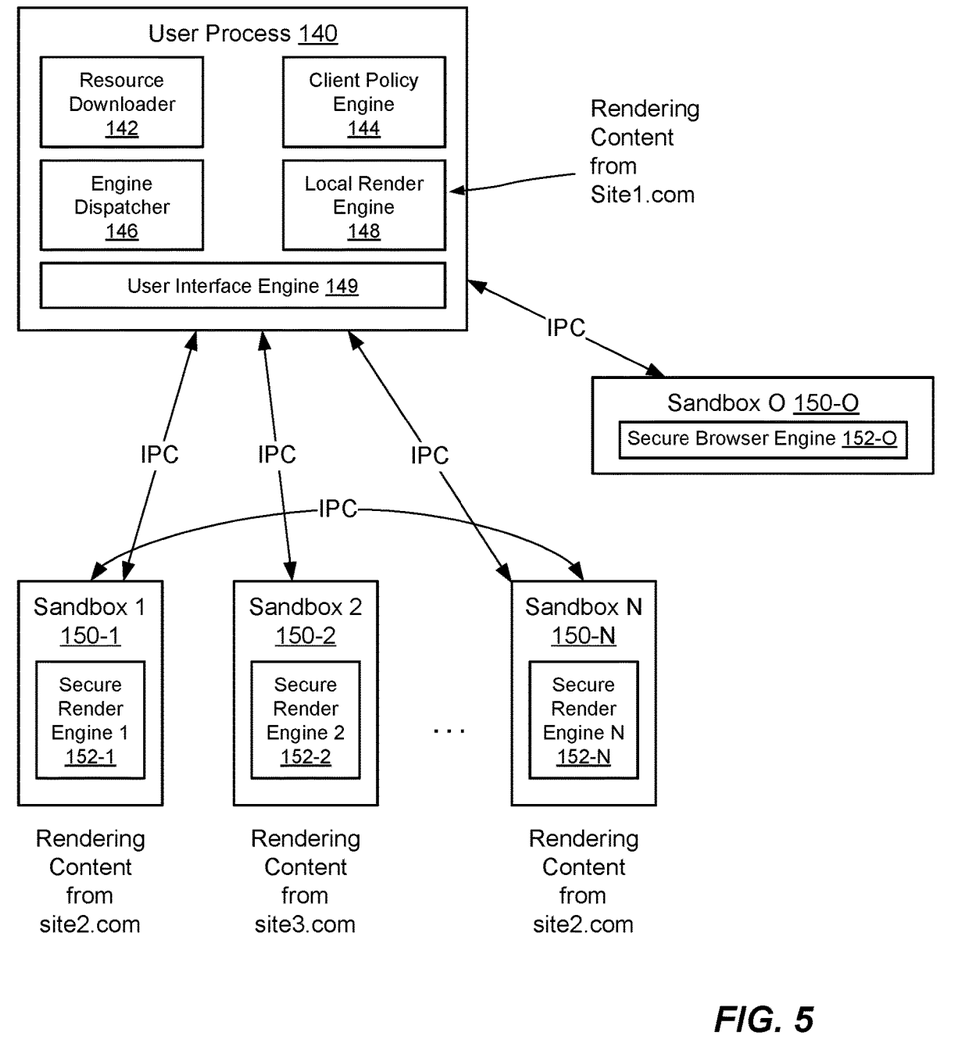
FIG. 5 is a block diagram showing example communication pathways among a user process and multiple sandboxes.

FIG. 5 shows example communication pathways among the user process 140 and the sandboxes 150. Here, the user process 140 has access to each of the sandboxes 150 via IPC (Inter-Process Communication). For example, the user process 140 can send data structures, such as DOM Instances 224, to the secure render engines in the sandboxes 150. It can also send JavaScript or other executable code. A significant value of the sandboxes 150 is that they isolate content of different web-content types 226 from one another, so as to prevent malicious content encountered by one render engine from spreading to other render engines, to the secure browser engine 152-O, or back to the user process 140. Providing the various structures in respective processes prevents sharing of data except through deliberate IPC instructions, which can be conducted securely.

In some examples, web-content types 226 are based at least in part on the domain of the content being accessed, with DOM nodes that specify different domains (e.g., as SRC attributes) dispatched to different render engines that run in respective sandboxes 150. As a further improvement, the client device 120 may block IPC between sandboxes that access content from different domains, to prevent the spread of malicious content from one domain to another, but allow IPC between sandboxes accessing content in the same domain. Thus, for example, in a case where the render engines in sandboxes 150-1 and 150-N both access content from a domain "Site2.com" only, the client device 120 permits IPC between sandbox 150-1 and sandbox 150-2. But if the render engine in sandbox 150-2 accesses content from a different domain, "Site3.com," the client device 120 blocks IPC between sandbox 150-2 and sandboxes 150-1 and 150-3. In this example, the local render engine 148 accesses content from domain "Site1.com," which may represent the domain of a landing page accessed by the client device 120.

Figure 6:
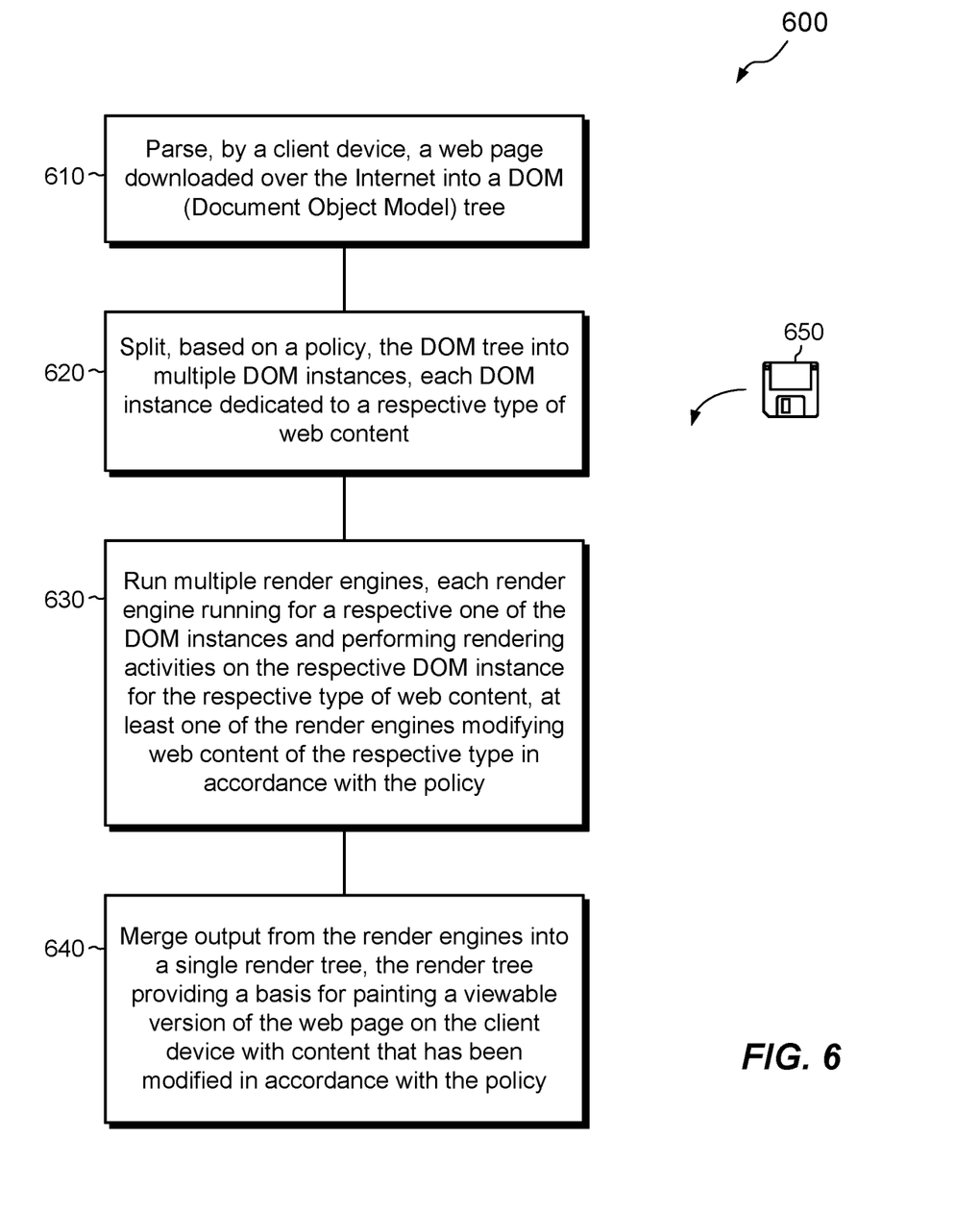
FIG. 6 is a flowchart showing an example method of securely rendering content downloaded over a network.

FIG. 6 shows an example method 600 that may be carried out in connection with the environment 100. The method 600 is typically performed, for example, by the software constructs described in connection with FIG. 1, which reside in the memory 130 of the client device 120 and are run by the processor(s) 124. The various acts of method 600 may be ordered in any suitable way. Accordingly, embodiments may be constructed in which acts are performed in orders different from that illustrated, which may include performing some acts simultaneously.

At 610, the client device 120 parses a web page 104 downloaded over the network 114 into a DOM (Document Object Model) tree 214.

At 620, the DOM tree 214 is split, based on a policy, into multiple DOM instances 224. Each DOM instance 224 is dedicated to a respective type 226 of web content.

At 630, the client device 120 runs multiple render engines 148 and 152-1 through 152-N. Each render engine runs for a respective one of the DOM instances 224 and performs rendering activities on the respective DOM instance 224 for the respective type 226 of web content. At least one of the render engines modifies web content of the respective type 226 in accordance with the policy.

At 640, output from the render engines is merged into a single render tree 230. The render tree 230 provides a basis for painting a viewable version of the web page 104 on the client device 120 with content that has been modified in accordance with the policy.

An improved technique has been described for securely rendering content downloaded over a network 114. The technique includes parsing a downloaded web page 104 into a DOM (Document Object Model) tree 214 and splitting the DOM tree 214 into multiple DOM instances 224, where each DOM instance is dedicated to a respective type 226 of web content. The technique processes each DOM instance 224 using a respective render engine (one of 148 and 152-1 through 152-N), which implements the security policy on the respective type of web content by blocking or altering content, and/or by limiting functionality that may be used in connection with the content.

Having described certain embodiments, numerous alternative embodiments or variations can be made. For example, the local render engine 148 has been shown and described as running within the user process 140. This is merely an example, however, as all render engines may be run in respective sandboxes. Alternatively, some embodiments may provide a single sandbox for all secure render engines, as well as for the secure browser engine 152-O, e.g., in cases where security concerns are less critical. Although sandboxes have been described as operating system processes, such as containers, they may alternatively be implemented using virtual machines. For example, the client device may run multiple virtual machines in respective guest operating systems, and provide each sandbox within its own virtual machine. The user process and the secure browser engine may run in other virtual machines, and communication among the virtual machines may be accomplished using a VMM (Virtual Memory Manager) or a similar feature.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of securely rendering content downloaded over a network, the method comprising:
   parsing, by a client device, a web page downloaded over the network into a DOM (Document Object Model) tree;
   splitting, based on a policy, the DOM tree into multiple DOM instances, each DOM instance dedicated to a respective type of web content;
   running multiple render engines, each render engine running for a respective one of the DOM instances and performing rendering activities on the respective DOM instance for the respective type of web content, at least one of the render engines modifying web content of the respective type in accordance with the policy; and
   merging output from the render engines into a single render tree, the render tree providing a basis for painting a viewable version of the web page on the client device with content that has been modified in accordance with the policy,
   wherein running the render engines includes running multiple render engines in respective sandboxes, wherein the client device enables a first render engine running in a first sandbox to access data of a second render engine running in a second sandbox responsive to the first render engine and the second render engine referencing content solely from a same web domain, and wherein the client device prevents the first render engine from accessing data of a third render engine in a third sandbox responsive to the first render engine and the third render engine referencing content from different web domains.

2. The method of claim 1, further comprising providing context information regarding an operating state of the client device to a policy engine that acts as a server of the policy, wherein splitting the DOM tree into multiple DOM instances is further based on the context information.

3. The method of claim 2, wherein splitting the DOM tree is performed by a user process running on the client device, and wherein at least one of the sandboxes is
   a dedicated operating system process that communicates with the user process using IPC (Inter-Process Communication).

4. The method of claim 3, further comprising:
   parsing the web page into a CSSOM (Cascading Style Sheet Object Model) tree, the CSSOM tree containing style information pertaining to web elements represented in the DOM tree; and
   prior to splitting the DOM tree, updating the DOM tree to include a set of style information represented in the CSSOM tree.

5. The method of claim 3, wherein splitting the DOM tree into multiple DOM instances includes traversing a set of nodes of the DOM tree and, for each current node of the set of nodes of the DOM tree,
   (i) querying the policy engine, the querying specifying the current node of the DOM tree,
   (ii) receiving, from the policy engine in response to the querying, an action indicator that indicates a security action to be performed on the current node in accordance with the policy,
   (iii) assigning, based at least in part on the action indicator, the current node to a current category of web content, and
   (iv) placing the current node and its attributes in a current DOM instance dedicated to the current category of web content.

6. The method of claim 5 wherein the method further comprises, in response to no current DOM instance having been created on the client device for the current category of web content, creating the current DOM instance dedicated to the current category of web content.

7. The method of claim 5, wherein the policy engine runs on a server connected to the client device over a computer network.

8. The method of claim 5, wherein running a render engine for the current DOM instance includes implementing a security action indicated by the action indicator.

9. The method of claim 8, wherein the categories of web content include a first category designated for image content, wherein splitting the DOM tree includes creating a first DOM instance dedicated to image content, and wherein, upon traversing the DOM tree, the method further comprises:
   encountering an image node in the DOM tree that specifies an image; and
   querying the policy engine by specifying the image node, the querying returning a first action indicator that indicates a watermark to be applied to the image,
   wherein running the render engines includes running a first render engine for the first DOM instance, the first render engine applying the watermark to the image.

10. The method of claim 8, wherein the categories of web content include a second category for video content, wherein splitting the DOM tree includes creating a second DOM instance dedicated to video content, and wherein, upon traversing the DOM tree, the method further comprises:
    encountering a video node in the DOM tree that specifies a video; and
    querying the policy engine by specifying the video node, the querying returning a second action indicator that indicates that the video is to be blocked,
    wherein running the render engines includes running a second render engine for the second DOM instance, the second render engine blocking the video.

11. The method of claim 8, wherein the categories of web content include a third category for text content, wherein splitting the DOM tree includes creating a third DOM instance dedicated to text content, and wherein, upon traversing the DOM tree, the method further comprises:
    encountering a text node in the DOM tree that includes a portion of text; and
    querying the policy engine by specifying the text node, the querying returning a third action indicator that indicates that the portion of text is to be replaced with alternative text and/or formatting,
    wherein running the render engines includes running a third render engine for the third DOM instance, the third render engine providing the alternative text and/or formatting in place of the portion of text.

12. The method of claim 8, further comprising:
    querying the policy engine by specifying a characteristic of the web page;
    in response to the querying, receiving back a fourth action indicator pertaining to a user action that the client device supports on the web page; and
    in response to the fourth action indicator indicating that the user action is prohibited, directing a user-interface engine to block the user action from being performed.

13. The method of claim 12, wherein the user action is a view-source action for enabling a user to view source code of the web page.

14. The method of claim 12, wherein the user action is a save-as action for enabling a user to save a copy of a web page or to save an element displayed in the web page.

15. The method of claim 5, wherein the client device generates the render tree with first security modifications in response to a first loading of the web page by the client device when the client device operates in a first context, and wherein the client device generates the render tree with second security modifications, different from the first security modifications, in response to a second loading of the web page by the client device when the client device operates in a second context.

16. The method of claim 5, wherein splitting the DOM tree includes providing, in at least one of the DOM instances, metadata that describes a structure of the DOM tree, and wherein merging the render instances into the single render tree includes (i) accessing the metadata and (ii) placing web elements into the render tree at locations described by the metadata.

17. A client device, comprising control circuitry that includes a set of processing units coupled to memory, the control circuitry constructed and arranged to:
    parse a web page downloaded over the network into a DOM (Document Object Model) tree;

split, based on a policy, the DOM tree into multiple DOM instances, each DOM instance dedicated to a respective type of web content;

run multiple render engines, each render engine running for a respective one of the DOM instances and performing rendering activities on the respective DOM instance for the respective type of web content, at least one of the render engines modifying web content of the respective type in accordance with the policy; and merge output from the render engines into a single render tree, the render tree providing a basis for painting a viewable version of the web page on a screen with content that has been modified in accordance with the policy, wherein the control circuitry constructed and arranged to split the DOM tree into multiple DOM instances is further constructed and arranged to traverse a set of nodes of the DOM tree and, for each current node of the set of nodes of the DOM tree, (i) query the policy engine, the querying engine in response to the querying, an action indicator that indicates a security action to be performed on the current node in accordance with the policy, (iii) assign, based at least in part on the action indicator, the current node to a current category of web content, and (iv) place the current node and its attributes in a current DOM instance dedicated to the current category of web content.

18. A computer program product including a set of non-transitory, computer-readable media having instructions which, when executed by control circuitry of a client device, cause the control circuitry to perform a method of securely rendering content downloaded over a network, the method comprising:

parsing, by a client device, a web page downloaded over the network into a DOM (Document Object Model) tree;

splitting, based on a policy, the DOM tree into multiple DOM instances, each DOM instance dedicated to a respective type of content;

running multiple render engines, each render engine running for a respective one of the DOM instances and performing rendering activities on the respective DOM instance for the respective type of web content, at least one of the render engines modifying web content of the respective type in accordance with the policy; and merging output from the render engines into a single render tree, the render tree providing a basis for painting a viewable version of the web page on the client device with content that has been modified in accordance with the policy, wherein running the render engines includes running multiple render engines in respective sandboxes, wherein the client device enables a first render engine running in a first sandbox to access data of a second render engine running in a second sandbox responsive to the first render engine and the second render engine referencing content solely from a same web domain, and wherein the client device prevents the first render engine from accessing data of a third render engine in a third sandbox responsive to the first render engine and the third render engine referencing content from different web domains.

* * * * *

UNITED STATES PATENT AND TRADEMARK OFFICE
CERTIFICATE OF CORRECTION

PATENT NO. : 11,074,338 B2
APPLICATION NO. : 16/343549
DATED : July 27, 2021
INVENTOR(S) : Xiaolu Chu and Shunli Ren It is certified that error appears in the above-identified patent and that said Letters Patent is hereby corrected as shown below:

In the Claims

Column 15, Lines 14-26 Please change last paragraph of Claim 17 as follows:
"wherein the control circuitry constructed and arranged to split the DOM tree into multiple DOM instances is further constructed and arranged to traverse a set of nodes of the DOM tree and, for each current node of the set of nodes of the DOM tree, (i) query the policy engine, the querying specifying the current node of the DOM tree, (iii) assign, based at least in part on the action indicator, the current node to a current category of web content, and (iv) place the current node and its attributes in a current DOM instance dedicated to the current category of web content."

To:
-- wherein the control circuitry constructed and arranged to split the DOM tree into multiple DOM instances is further constructed and arranged to traverse a set of nodes of the DOM tree and, for each current node of the set of nodes of the DOM tree, (i) query the policy engine, the querying specifying the current node of the DOM tree, (ii) receive, from the policy engine in response to the querying, an action indicator that indicates a security action to be performed on the current node in accordance with the policy, (iii) assign, based at least in part on the action indicator, the current node to a current category of web content, and (iv) place the current node and its attributes in a current DOM instance dedicated to the current category of web content. --

Signed and Sealed this
Twenty-second Day of November, 2022

Katherine Kelly Vidal
*Director of the United States Patent and Trademark Office*